Dec. 12, 1961     E. J. MOONEY     3,012,949
DEVICE FOR DIVERTING REFLUX
Filed Aug. 19, 1959     3 Sheets-Sheet 1

Edmund J. Mooney
INVENTOR.

Dec. 12, 1961
E. J. MOONEY
3,012,949
DEVICE FOR DIVERTING REFLUX
Filed Aug. 19, 1959
3 Sheets-Sheet 2
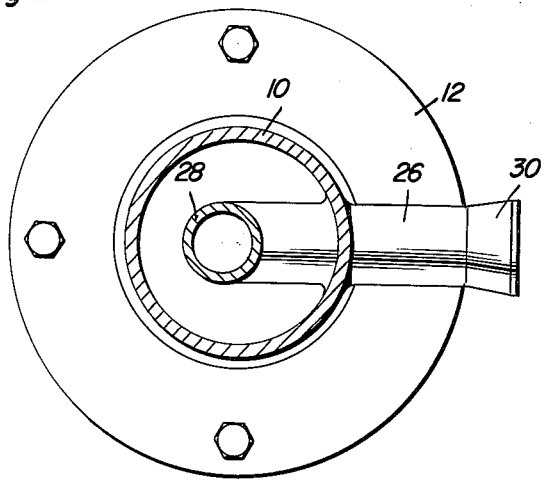
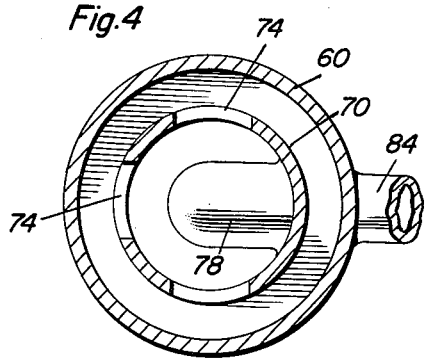
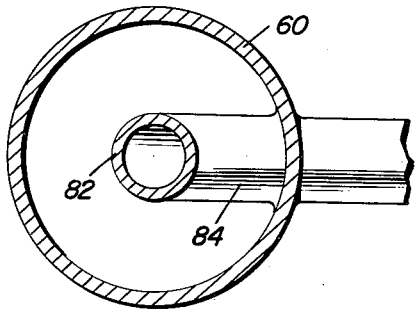
Edmund J. Mooney
INVENTOR.

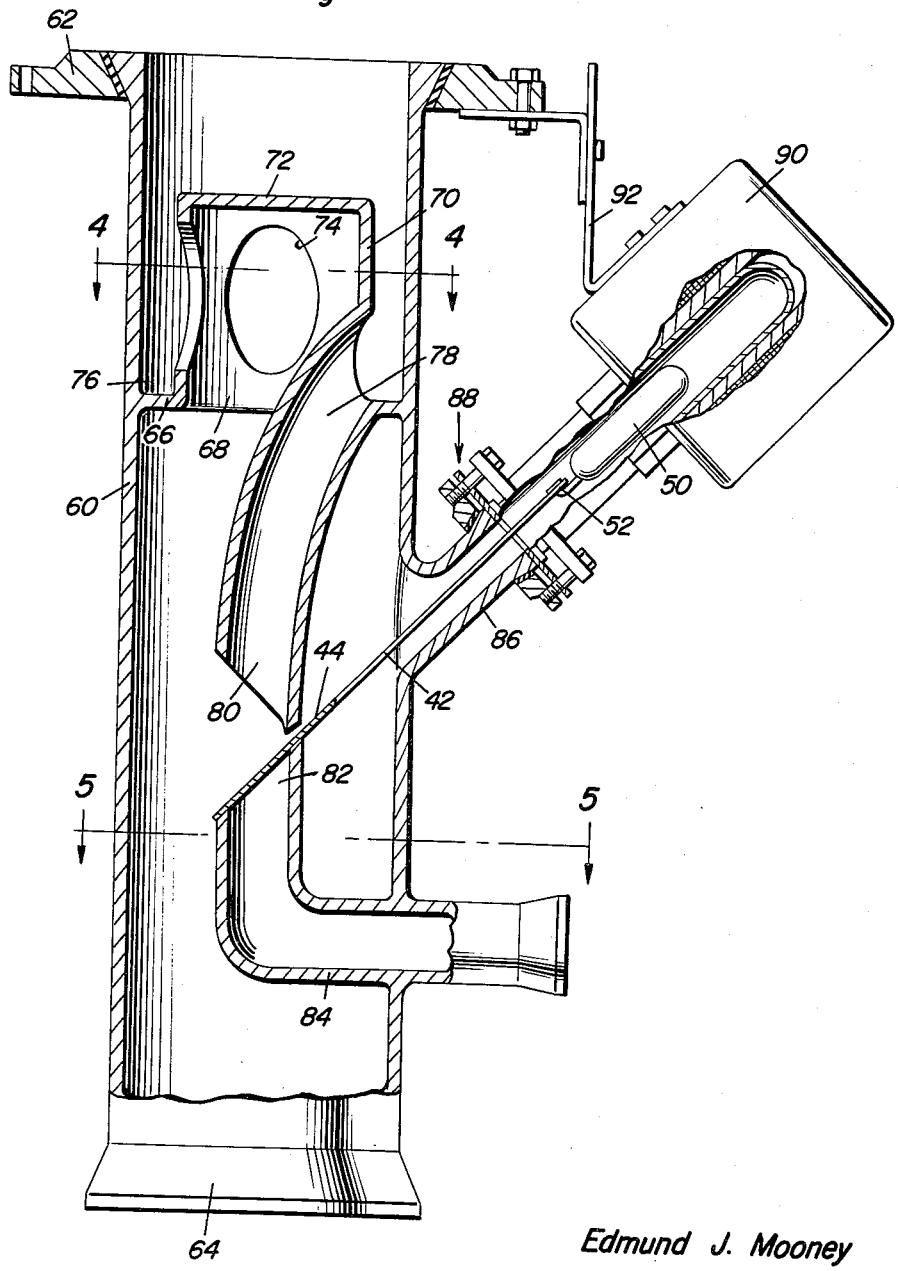

[Patent No.] 3,012,949
[Patented] Dec. 12, 1961

3,012,949
DEVICE FOR DIVERTING REFLUX
Edmund J. Mooney, 123 Dell Glen Ave., Lodi, N.J.
Filed Aug. 19, 1959, Ser. No. 834,874
3 Claims. (Cl. 202—161)

This invention comprises a novel and useful device for diverting reflux, commonly known as a reflux splitter, and more specifically pertains to an apparatus to effect separation of a portion of reflux or condensate in certain chemical reactions, for various purposes.

In chemical and petroluem processes where condensers, columns or the like are used, and a certain amount of the condensate or reflux is returned to the reactor or column, it is frequenly desired for various purposes such as sampling, or for withdrawing a portion of the reflux for other uses, to remove or separate a part of the reflux from the condensate flow. In such instances, it is therefore highly desirable to have the column or conduit in which the reflux is passing to include therein a means which may be easily put into or put out of operation for selectively removing or withdrawing a portion of the reflux therefrom.

It is therefore the primary purpose of this invention to provide a means whereby a portion of the reflux may be readily diverted from the reflux column or conduit as desired.

Yet another object of the invention is to provide an apparatus in accordance with the foregoing object in which the actuating means therefor shall be conveniently mounted upon the exterior of the column through which the fluid passes and shall effect operation of a reflux diverting gate by which reflux may be withdrawn from the column.

Yet another more specific object of the invention is to provide a device in accordance with the preceding objects wherein the actuation of the reflux splitter may be conveniently effected by a solenoid, compactly mounted upon and carried by the column.

A still further object of the invention is to provide a reflux splitter or remover which shall include a take-off line positioned directly in the path of flow of the reflux together with a diverting gate valve controlling this take-off line and selectively operable to either divert the reflux from the take-off line or to admit the reflux to the take-off line as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a horizontal sectional view taken substantially upon the plane indicated by section line 2—2 of FIGURE 1;

Figure 1:
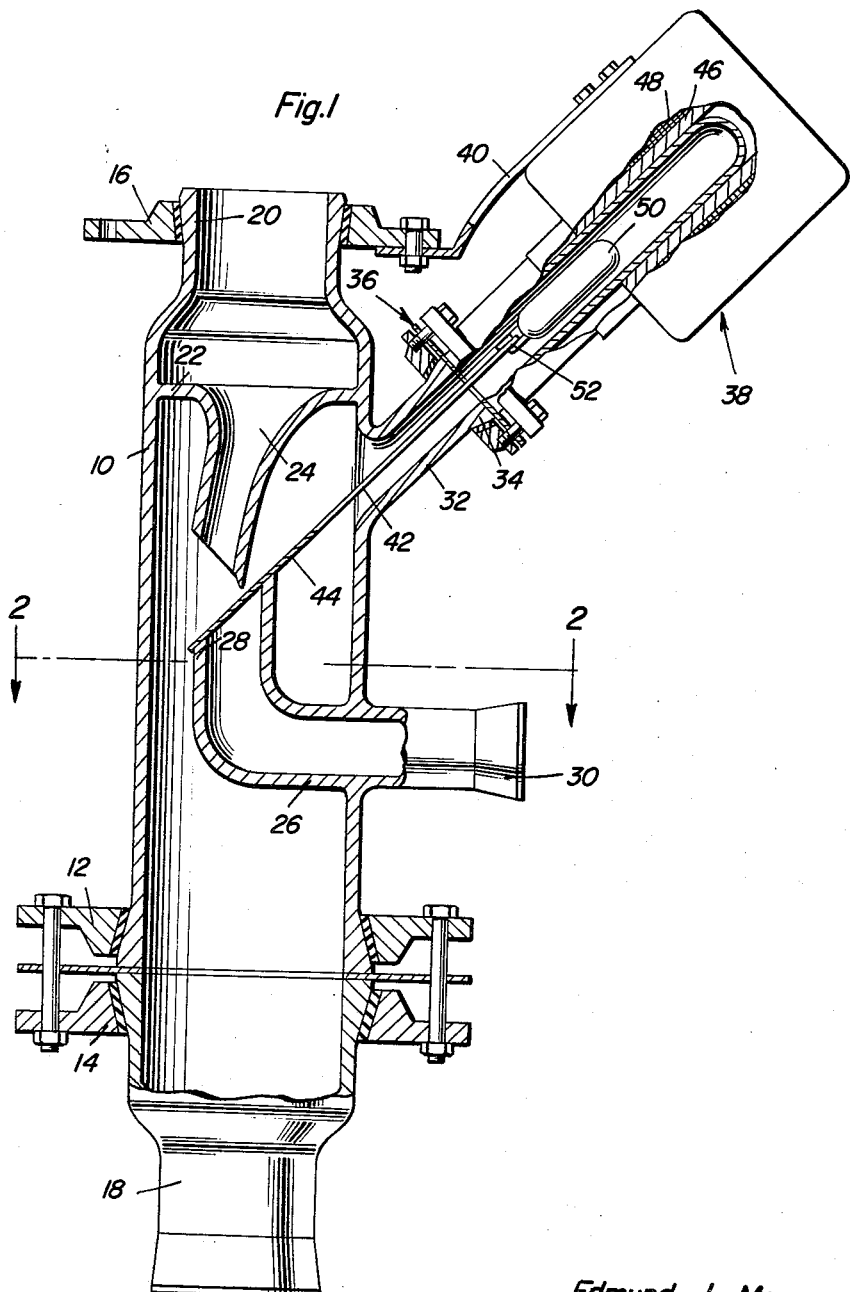
FIGURE 1 is a vertical longitudinal sectional view of an in-line reflux splitter having a flow of liquid in a downward direction together with an embodiment of apparatus in accordance with this invention applied thereto, the parts being shown in position for normal operation of the reflux splitter and for opening the reflux take-off line and diverting flow of liquid therefrom.

FIGURE 3 is a view similar to FIGURE 1 but showing a second embodiment of the invention having a flow of vapor in an upward direction and a flow of liquid in a downward direction together with an embodiment of apparatus with the parts being shown in position for normal operation of the reflux splitter and for opening the reflux take-off time and diverting flow of liquid therefrom; and, FIGURES 4 and 5 are horizontal sectional views taken substantially upon the planes indicated by the section lines 4—4 and 5—5, respectively of FIGURE 3.

Reference is made first to the embodiment illustrated in FIGURE 1 and wherein the numeral 10 designates the body of an apparatus in which there is a down flow of liquid reflux. This body or tower 10 is supported by conventional support means such as the support flanges at the lower end thereof and a support flange at its upper end. Through the inlet 20 at the upper end liquid or reflux enters the apparatus. It is this reflux flow which it is desired to withdraw from time to time for various purposes, and for which the apparatus of this invention is primarily concerned.

Accordingly, there is provided within the upper end of the tower 10 a transversely extending partition 22 having a centrally downwardly disposed funnel shaped reflux passage 24 by which the liquid or reflux accumulating above the partition may be drained and dropped therebeneath.

Extending through a side wall of the tower or column 10 is a transversely extending reflux take-off passage 26 having its adit 28 disposed beneath in vertical alignment with the liquid or reflux passage 24 so that when the upper end of the adit is open, the reflux can drop thereinto and will then pass laterally through the wall of the tower and from the outlet end 30 of the reflux take-off passage 26 to any suitable destination not shown.

As shown in FIGURE 1 the reflux take-off passage consists of a tube or sleeve which is formed integrally with the wall of the column or tower 10 although it will be understood that any means may be provided by which the take-off passage may extend through the wall of the tower in a fluid tight manner.

Also extending outwardly from the wall of the column or tower 10 is a tubular portion 32 to the outer end of which and to the laterally enlarged annular portion 34 thereof there is detachably coupled as by a conventional form of clamp indicated generally by the numeral 36 a housing 38. This housing is also secured as by a bracket 40 to the upper flange 16 of the tower as shown in FIGURE 1.

Slidably through the tubular projection 32 is a blade 42 having a flat gate-like member 44 at its lower end which is adapted to slidingly engage the top surface of the adit portion 28 of the reflux take-off passage 26. The housing 38 preferably contains as the actuating means for the blade 42 and gate 44 a solenoid 46 having the usual electrical windings as at 48 and by means of which the solenoid armature core 50 which is connected as at 52 to the blade 42 effects reciprocation of the latter in the tubular portion 32.

The arrangement is such that when the solenoid is energized, the blade 42 will be lifted upwardly causing the gate 44 to uncover the adit 28 whereby the stream of reflux through the passage 24 may drop into the adit of the reflux take-off passage 26 and thus be recovered or removed from the latter. However, when the solenoid is de-energized, the blade 42 and gate 44 will return to their position shown in FIGURE 1, even under the influence of gravity or aided by any suitable means such as a spring or the like and thus will close the adit and divert the reflux from the passage 24 away from the reflux take-off passage.

Thus there has been provided a means which will form a part of and readily incorporate into a conventional reflux column or tower and which is readily operable to selectively take-off reflux therefrom or which will divert the downcoming stream of reflux away from the take-off passage as desired.

In the arrangement of FIGURE 3 a somewhat different association of the reflux take-off means is provided. In this form of the apparatus there is shown a direct flow reflux tower 60 which has a mounting flange 62 supporting the same at its upper end and has an inlet end 64 at its lower end into which ascending gases and vapors are introduced into the column. Adjacent the upper end there is provided a diametrical extending partition 66 having a central opening 68 therethrough. Rising from and surrounding this opening is a casing 70 having a top closure wall 72 together with a plurality of gas discharge openings 74 in the side walls thereof. This arrangement is such that ascending vapors can pass upwardly into the housing 70 and will then emerge through the opening 74 into the interior of the column above the partition 66.

However, liquids condensing out of the vapors and constituting a reflux which will pass downwardly through the column 60, will be collected in an annular trap formed about the exterior surface of the housing 70 and the interior surface of the walls of the column 60 and above the lower edges of the outlet opening 74. The reflux collected in this annular trap indicated by the numeral 76 is then discharged downwardly by a passage means 78 lying adjacent a side wall of the column, and having an exit portion 80 discharged in the reflux axially of the column and downwardly and in line with the inlet or adit 82 of the reflux take-off tube 84, which is similar in respect to the take-off passage 26 previously mentioned.

As in the preceding embodiment there is provided the tubular projection 86 having by means of a coupling flange assembly 88 a housing 90 secured thereto. This housing contains the same solenoid construction previously described and to which the same numerals have been applied, and by means of which the blade 42 is operated to actuate the gate 44 controlling the adit 82. A bracket 92 likewise assists in supporting the housing 90 from the support means 62 at the upper end of the column.

This form of the invention is similar in its operation to that previously described except that the diverting means is applied to a somewhat different type of reflux column. Thus, in this embodiment, the vapors ascend along the center of the column while the reflux returns along the outside thereof, being trapped in the trap 76 and from thence being discharged by the reflux passage 78 where they may be selectively diverted by the gate 44 and pass on down the column 60, or may be allowed to fall into the adit 82 of the reflux take-off passage 84.

It will be apparent from both embodiments of this apparatus that any desired portions of reflux may be removed and taken off from the reflux stream at intervals as desired, without interrupting the process being performed by the apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a reflux column, a partition across said column having a reflux passage means therethrough having a reflux conduit depending therefrom, a reflux take-off conduit extending through the wall of said column and having an open adit disposed in vertical alignment beneath said passage means and reflux conduit for receiving reflux therefrom, a control means for said reflux take-off conduit including a gate slidable across said adit in a direction including downwardly of said column, said gate being likewise downwardly inclined, and selectively operable to uncover said adit and to divert reflux therefrom, actuating means for said gate, said actuating means comprising an actuating member on the exterior of said column and a connecting means extending through the wall of said column and secured to said gate and said actuating member, means supporting said actuating member upon said column in vertically spaced relation to sade take-off conduit, said reflux passage means having its exit disposed axially of said column, the inlet of said reflux passage means being disposed peripherally of said column.

2. In a reflux column, a partition across said column having a reflux passage means therethrough having a reflux conduit depending therefrom, a reflux take-off conduit extending through the wall of said column and having an open adit disposed in vertical alignment beneath said passage means and reflux conduit for receiving reflux therefrom, a control means for said reflux take-off conduit including a gate slidable across said adit in a direction including downwardly of said column, said gate being likewise downwardly inclined, and selectively operable to uncover said adit and to divert reflux therefrom, actuating means for said gate, said actuating means comprising an actuating member on the exterior of said column and a connecting means extending through the wall of said column and secured to said gate and said actuating member, means supporting said actuating member upon said column in vertically spaced relation to said take-off conduit, said partition having a central opening with an upstanding casing on said partition surrounding the rim of said central opening and defining a reflux condensate trap between the latter and the wall of said column, said reflux passage means having its adit in said condensate trap.

3. The combination of claim 2 wherein said casing has a top wall overlying said central opening and vapor outlet openings in the wall of said casing.

References Cited in the file of this patent

UNITED STATES PATENTS

| 1,865,400 | McConnell | June 28, 1932 |
| 2,218,624 | Robertson | Oct. 22, 1940 |
| 2,251,185 | Carter et al. | July 29, 1941 |
| 2,476,477 | Berg | July 19, 1949 |
| 2,903,401 | Heere | Sept. 8, 1959 |